US007000816B1

(12) United States Patent  
Mikelsons et al.

(10) Patent No.: US 7,000,816 B1  
(45) Date of Patent: Feb. 21, 2006

(54) LOADING SYSTEM FOR ELONGATED STRAND OF FOOD PRODUCT

(75) Inventors: Andi J. Mikelsons, Middleton, WI (US); Luke A. Titel, Johnson Creek, WI (US); Jerome P. Lehman, Madison, WI (US); Dennis F. Conohan, Cross Plains, WI (US)

(73) Assignee: Alkar-Rapidpak, Inc., Lodi, WI (US)

( * ) Notice: Subject to any disclaimer, the term of this patent is extended or adjusted under 35 U.S.C. 154(b) by 0 days.

(21) Appl. No.: 10/672,642

(22) Filed: Sep. 26, 2003

(51) Int. Cl.  
*B65H 51/02* (2006.01)  
*B65H 51/30* (2006.01)

(52) U.S. Cl. .............................. 226/2; 226/29; 226/33; 226/104; 226/111; 226/172; 226/176; 452/51

(58) Field of Classification Search .................... 226/1, 226/2, 4, 5, 8, 29, 30, 33, 42, 43, 104, 105, 226/107, 109, 111, 112, 115, 117, 120, 139, 226/172, 176, 188; 452/51, 182, 183  
See application file for complete search history.

(56) References Cited

U.S. PATENT DOCUMENTS

| 1,654,871 A | * | 1/1928 | Gage et al. .................... 53/122 |
| 3,054,545 A | * | 9/1962 | Karius .......................... 452/51 |
| 3,204,844 A | | 9/1965 | Wallace |
| 3,552,620 A | * | 1/1971 | Neubeck, Jr. ................ 226/105 |
| 3,559,905 A | * | 2/1971 | Palynchuk ................ 242/390.5 |
| 3,620,431 A | * | 11/1971 | Wallace ....................... 226/109 |
| 3,747,821 A | * | 7/1973 | Neubeck et al. ............. 226/104 |
| 3,946,918 A | * | 3/1976 | Babbin et al. .................. 226/1 |
| 4,218,003 A | * | 8/1980 | Plewa et al. ................... 452/31 |
| 5,103,718 A | | 4/1992 | Schreiber et al. |
| 5,163,864 A | | 11/1992 | Burger et al. |
| 5,197,915 A | * | 3/1993 | Nakamura et al. ............ 452/51 |
| 5,244,683 A | | 9/1993 | Schreiber et al. |
| 5,398,598 A | | 3/1995 | McFarlane et al. |
| 5,533,658 A | * | 7/1996 | Benedict et al. ............. 226/172 |
| 5,971,842 A | * | 10/1999 | Simpson et al. .............. 452/51 |
| 6,056,636 A | | 5/2000 | Cody et al. |
| 6,086,469 A | | 7/2000 | Cody et al. |
| 6,189,758 B1 | * | 2/2001 | Cherix ........................ 226/177 |
| 6,277,018 B1 | | 8/2001 | Cody et al. |
| 6,494,311 B1 | | 12/2002 | Muller |

* cited by examiner

*Primary Examiner*—Kathy Matecki  
*Assistant Examiner*—Scott Haugland  
(74) *Attorney, Agent, or Firm*—Andrus, Sceales, Starke & Sawall, LLP

(57) ABSTRACT

A loading system is provided for loading an elongated strand of food product of given diameter on a moving transport conveyor. First and second loading conveyors are separated by a gap of dimension less than or equal to the diameter of the food product strand and convey the strand to a transfer ramp by an indexed drive.

12 Claims, 6 Drawing Sheets

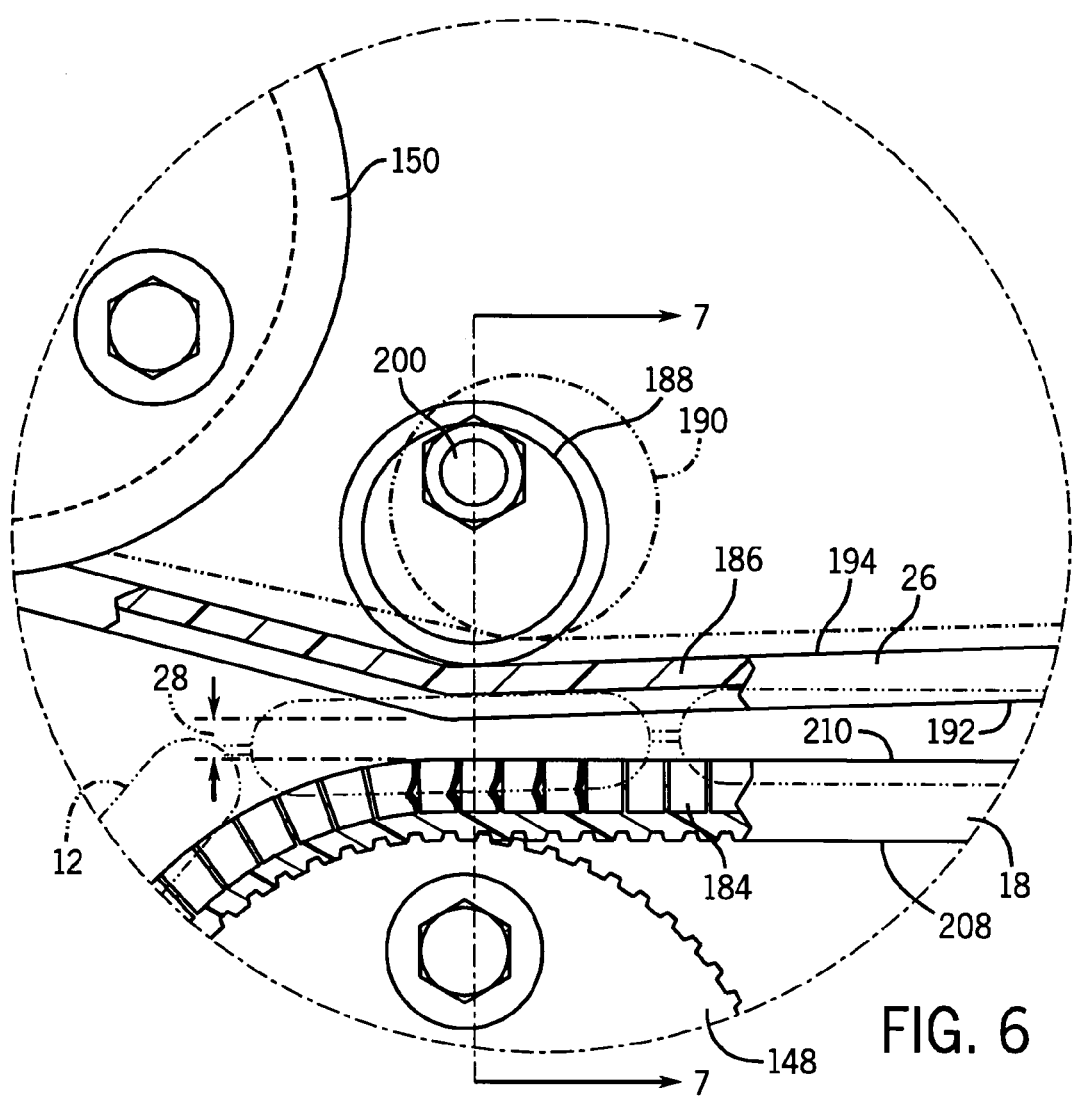
FIG. 6
FIG. 7
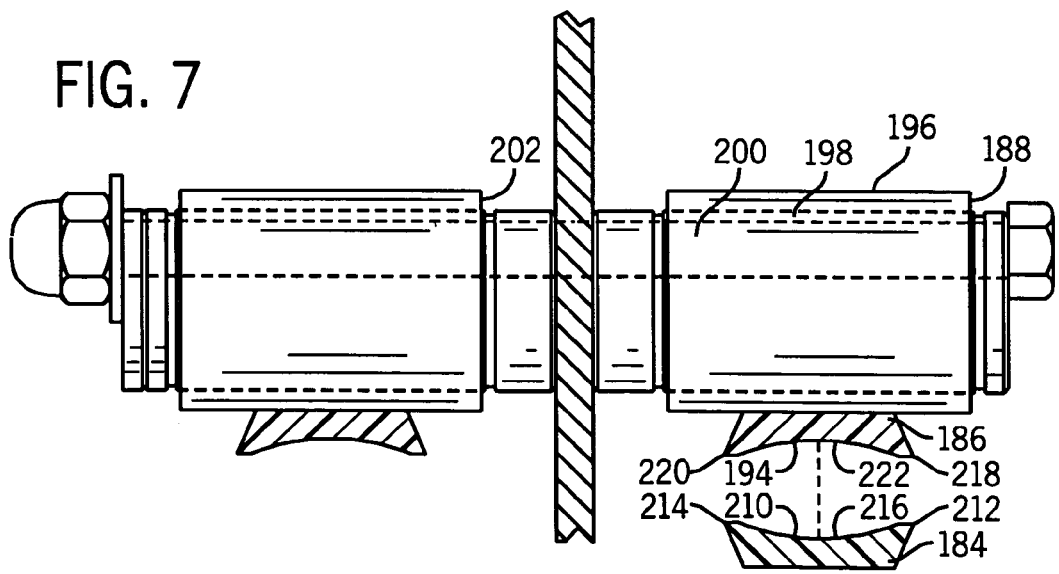

LOADING SYSTEM FOR ELONGATED STRAND OF FOOD PRODUCT

BACKGROUND AND SUMMARY

The invention relates to food product loading systems for loading an elongated strand of food product onto a moving transport conveyor, including food product in a casing having tubular segments serially joined by pinched connection segments, e.g. hot dogs, sausage links, etc.

The invention arose during continuing development efforts directed toward loading systems, and provides improvements in speed, reliability, uniform loading, low maintenance, and reduced downtime.

BRIEF DESCRIPTION OF THE DRAWINGS

FIG. 6 is an enlarged view of a portion of FIG. 3 as shown at line 6—6.

FIG. 7 is a sectional view taken along line 7—7 of FIG. 6.

DETAILED DESCRIPTION

Figure 1:
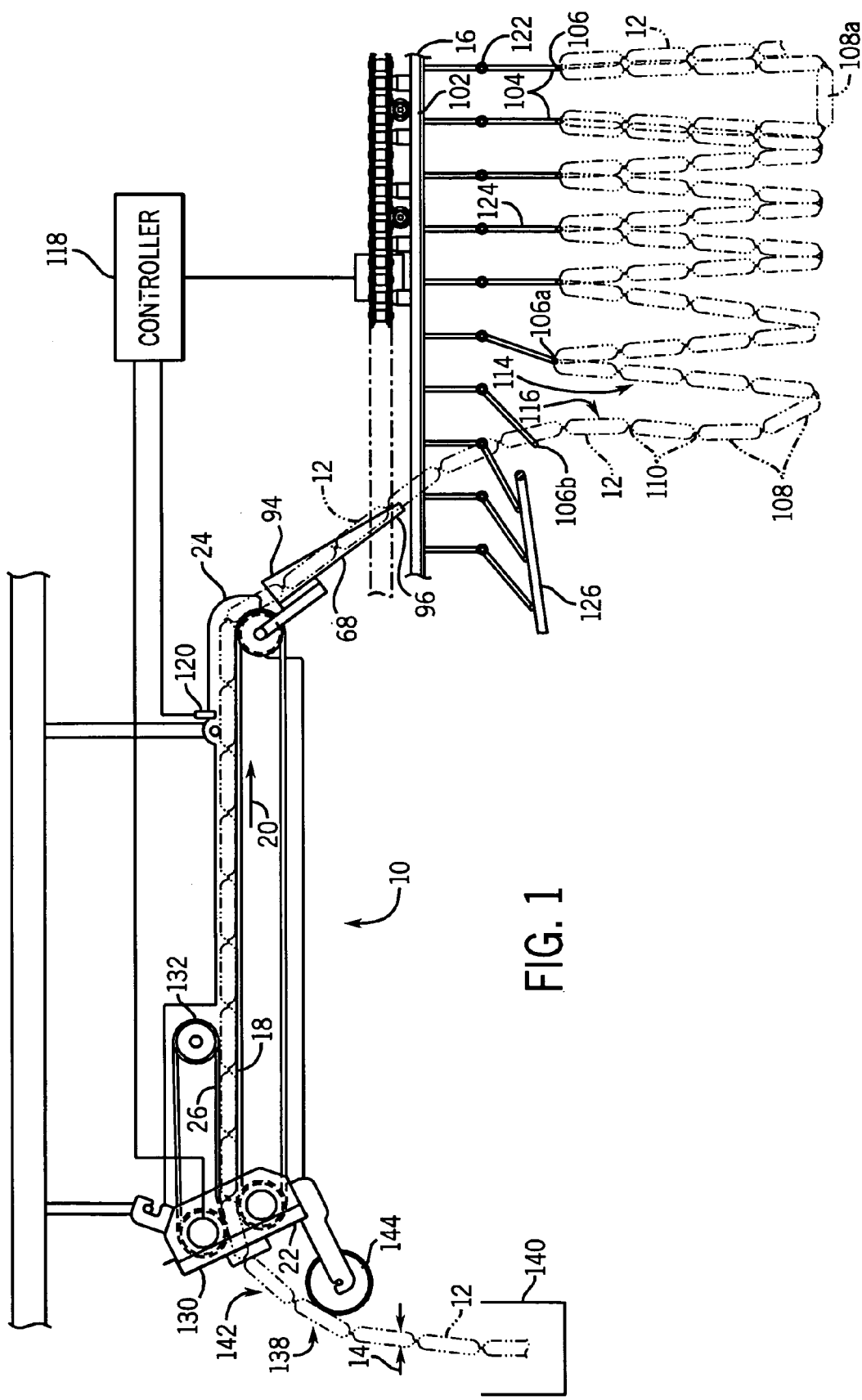
FIG. 1 is a side elevation view of a loading system in accordance with the invention.

FIG. 1 shows a loading system 10 for loading an elongated strand 12 of food product of given diameter 14 on a moving transport conveyor 16. A first loading conveyor 18, FIGS. 1, 3, extends along a forward travel direction 20 from an upstream entrance end 22 to a downstream exit end 24. A second loading conveyor 26 is spaced above conveyor 18 by a gap 28, FIGS. 3, 6, 4, having a dimension less than or equal to the noted given diameter 14 such that strand 12 is frictionally engaged by both conveyors 18 and 26 to pull the strand into gap 28 and such that the strand is conveyed from upstream entrance end 22 to downstream exit end 24 by an indexed drive 30, FIG. 5, to be described, and discharged at downstream exit end 24 to transport conveyor 16. The transport conveyor 16 may be like that shown in U.S. Pat. Nos. 3,204,844, 5,103,718, 5,244,683, 5,398,598, 6,056,636, 6,086,469, incorporated herein by reference. Conveyor 16 transports the food product to further downstream processing stations, such as cookers, chillers, etc., as is known.

Figure 2:
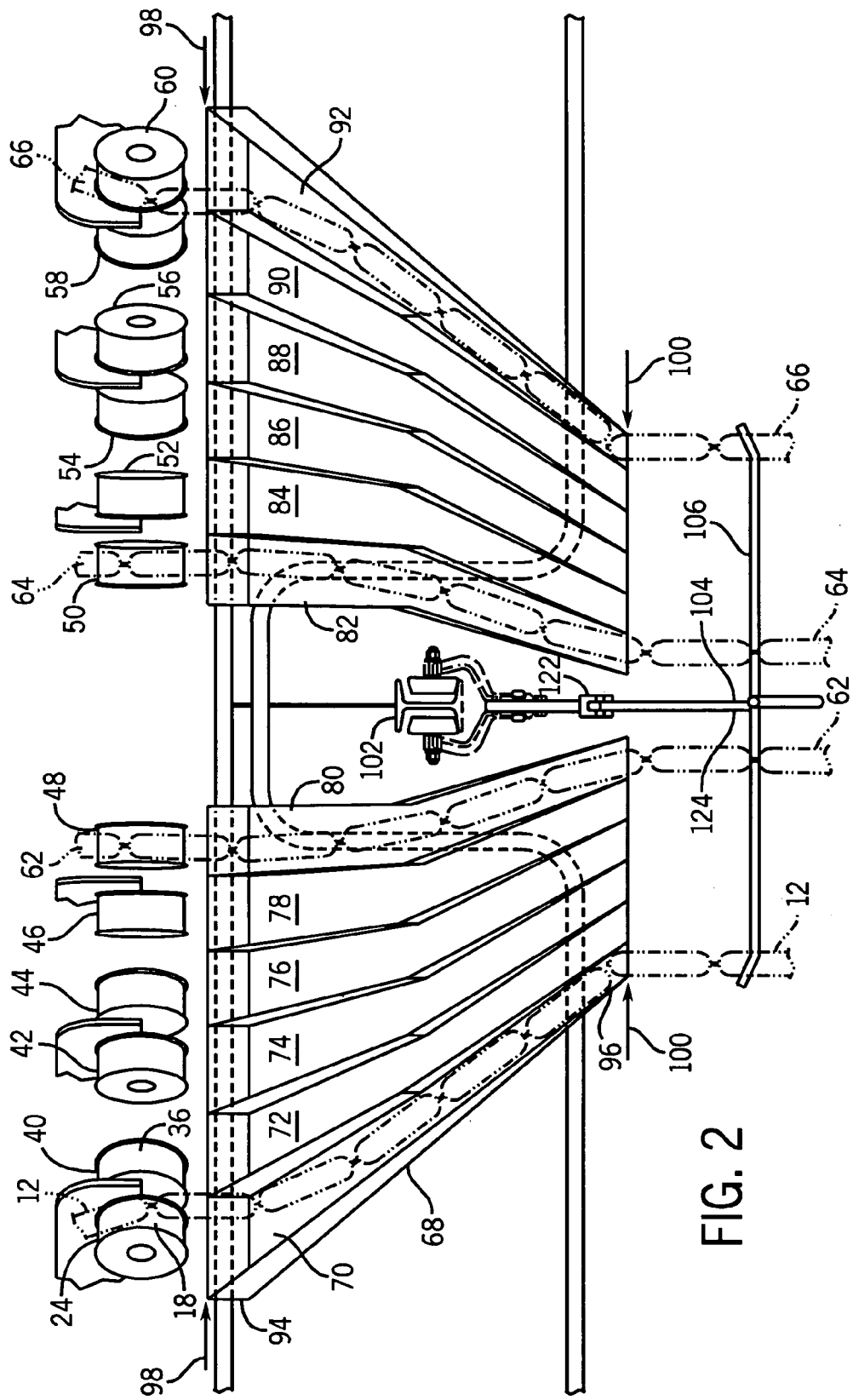
FIG. 2 is an end view of the loading system of FIG. 1.
Figure 4:
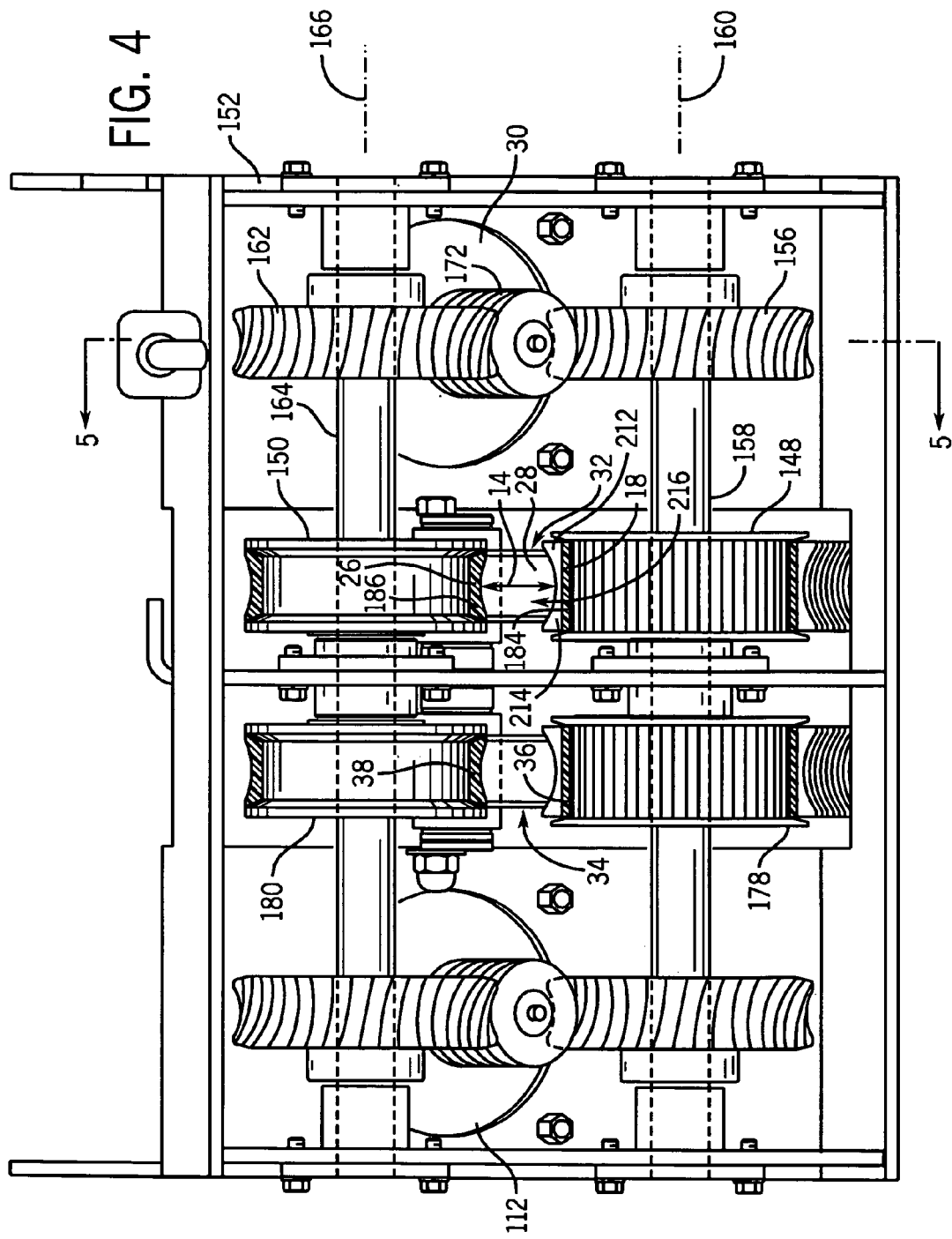
FIG. 4 is a sectional view taken along line 4—4 of FIG. 3.

A plurality of pairs of first and second loading conveyors 18 and 26 are provided for conveying a plurality of respective strands of food product in parallel along the noted forward travel direction 20 from respective parallel entrance ends such as 22 to respective parallel exit ends such as 24. For example, FIG. 4 shows a first entrance end 32 having a first pair of loading conveyors 18 and 26, and a second entrance end 34 having a second pair of loading conveyors 36 and 38. FIG. 2 shows a plurality of parallel exit ends 24, 40, 42, 44, 46, 48, 50, 52, 54, 56, 58, 60 discharging respective strands of food product, for example as shown in dashed line at strand 12 from exit end 24, strand 62 from exit end 48, strand 64 from exit end 50, and strand 66 from exit end 60. All of the exit ends and their respective conveyor pairs may be used, or only some may be used as shown in FIG. 2. A transfer ramp 68, FIGS. 1, 2, extends forwardly and downwardly from the noted parallel exit ends to discharge the respective parallel food product strands onto transport conveyor 16. The transfer ramp has a plurality of channels 70, 72, 74, 76, 78, 80, 82, 84, 86, 88, 90, 92, one for each possible strand, i.e. one for each of the noted discharge exit ends even if unused. The noted channels transfer the respective strands in parallel to transport conveyor 16. Transfer ramp 68 has an upstream end 94 at the noted parallel exit ends 24, 40, 42, 44, 46, 48, 50, 52, 54, 56, 58, 60 of the noted loading conveyors, and has a downstream end 96 at transport conveyor 16. Upstream end 94 of transfer ramp 68 has a first lateral width 98 transverse to forward travel direction 20. Downstream end 96 of transfer ramp 68 has a second lateral width 100 transverse to forward travel direction 20. Second lateral width 100 is less than first lateral width 98. The noted channels extend forwardly and downwardly and laterally inwardly from the ramp entrance end to the ramp exit end.

Transport conveyor 16 is a monorail 102, FIGS. 1, 2, having a plurality of chain-driven spaced apart hangers 104 each presented separately to and traversing past downstream end 96 of transfer ramp 68. Each hanger 104 travels in a direction parallel to forward travel direction 20 as it traverses past and away from ramp end 96, i.e., rightwardly in FIG. 1, which is out of the page toward the reader in FIG. 2. Each hanger 104 has a rod 106 extending along a direction parallel to downstream ramp end 96 and transverse to forward travel direction 20, i.e., rod 106 extends left-right in FIG. 2, and into and out of the page in FIG. 1. Each rod 106 carries a plurality of strands of food product draped thereover from respective channels 70, 72, 74, 76, 78, 80, 82, 84, 86, 88, 90, 92, some of which are shown in dashed line in FIG. 2 at strands 12 (from channel 70), 62 (from channel 48), 64 (from channel 50), and 66 (from channel 60).

Figure 5:
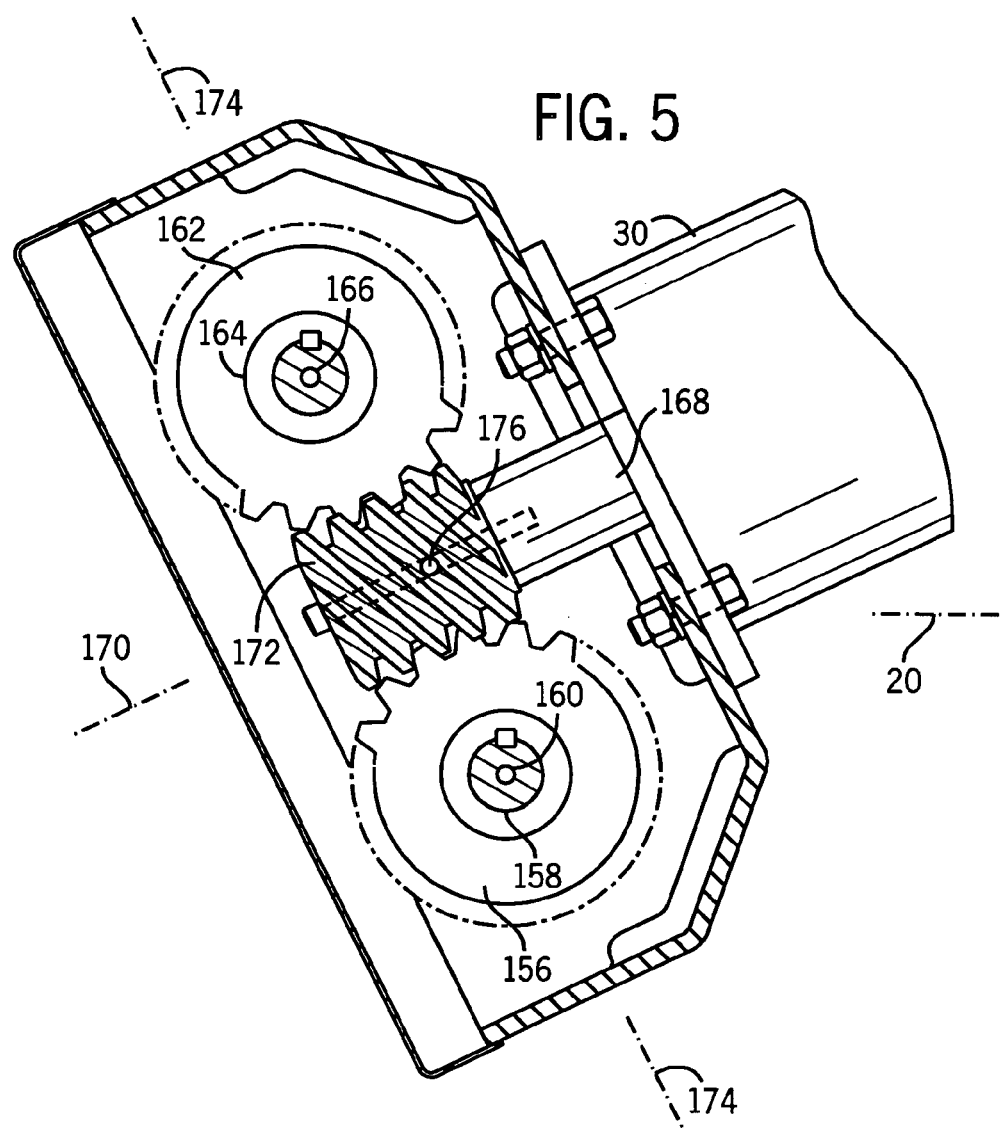
FIG. 5 is a sectional view taken along line 5—5 of FIG. 4.

Each of the noted strands of food product is provided by a casing having tubular segments such as 108, FIG. 1, serially joined by pinched connection segments such as 110. A plurality of drives such as motor 30, FIG. 5, are provided, one for each conveyor pair, for example drive 30, FIG. 4, for conveyor pair 18, 26, drive 112 for conveyor pair 36, 38, and so on. In the embodiment shown in FIG. 2, there would be twelve drives, one for each conveyor pair for each respective strand conveyed to each respective discharge end 24, 40, 42, 44, 46, 48, 50, 52, 54, 56, 58, 60 for each of the respective noted channels 70, 72, 74, 76, 78, 80, 82, 84, 86, 88, 90, 92. Each drive is indexed to drape a given number of tubular segments 108 vertically downwardly at 114, FIG. 1, and then upwardly at 116, between adjacent rods such as 106a and 106b in a given hang pattern. In the preferred embodiment, the number of tubular segments 108 of a given strand such as 12 extending downwardly rearwardly at 114 from a given rod such as 106a is a hang count greater than or equal to 3, and less than or equal to 5, and the number of tubular segments 108 extending upwardly at 116 to the next rod 106b is equal to the noted hang count. The number of tubular segments 108 draped between adjacent rods may further include a lower tubular segment such as 108a extending horizontally between downwardly extending tubular segments and upwardly extending tubular segments. In a first embodiment, each drive 30, 112, etc. is indexed at a fixed speed synchronized to transport conveyor 16, e.g. by a controller 118. In another embodiment, each drive is indexed to travel a fixed distance equal to the number of tubular segments 108 of the respective strand in the hang pattern. In a further embodiment, a sensor 120 is provided for each drive sensing the indexed tubular segments 108 of the respective strand and providing feedback to the respective drive, e.g. via controller 118, to adjust the fixed travel distance to compensate for slipping of the respective strand along the loading system. It is preferred that each drive 30, 112, etc. is a servo motor.

Each hanger 104, FIGS. 1, 2, is preferably an inverted T-bar hanging from the transport conveyor in pivoted relation e.g. at pivot 122, as in incorporated U.S. Pat. No. 3,204,844. The inverted T-bar hanger 104 has a downwardly depending trunk 124 and a lateral horizontal cross-bar at the bottom thereof to provide rod 106. Camming ramp 126 engages and pivots each T-bar upwardly and rearwardly (leftwardly and clockwise in FIG. 1) to widen the gap to the next leading T-bar to the right thereof while such next leading T-bar is being loaded with strands from the respective channels of transfer ramp 68. Camming of inverted T-bar hangers is known in the prior art, for example as shown in the noted incorporated U.S. Pat. No. 3,204,844.

Figure 3:
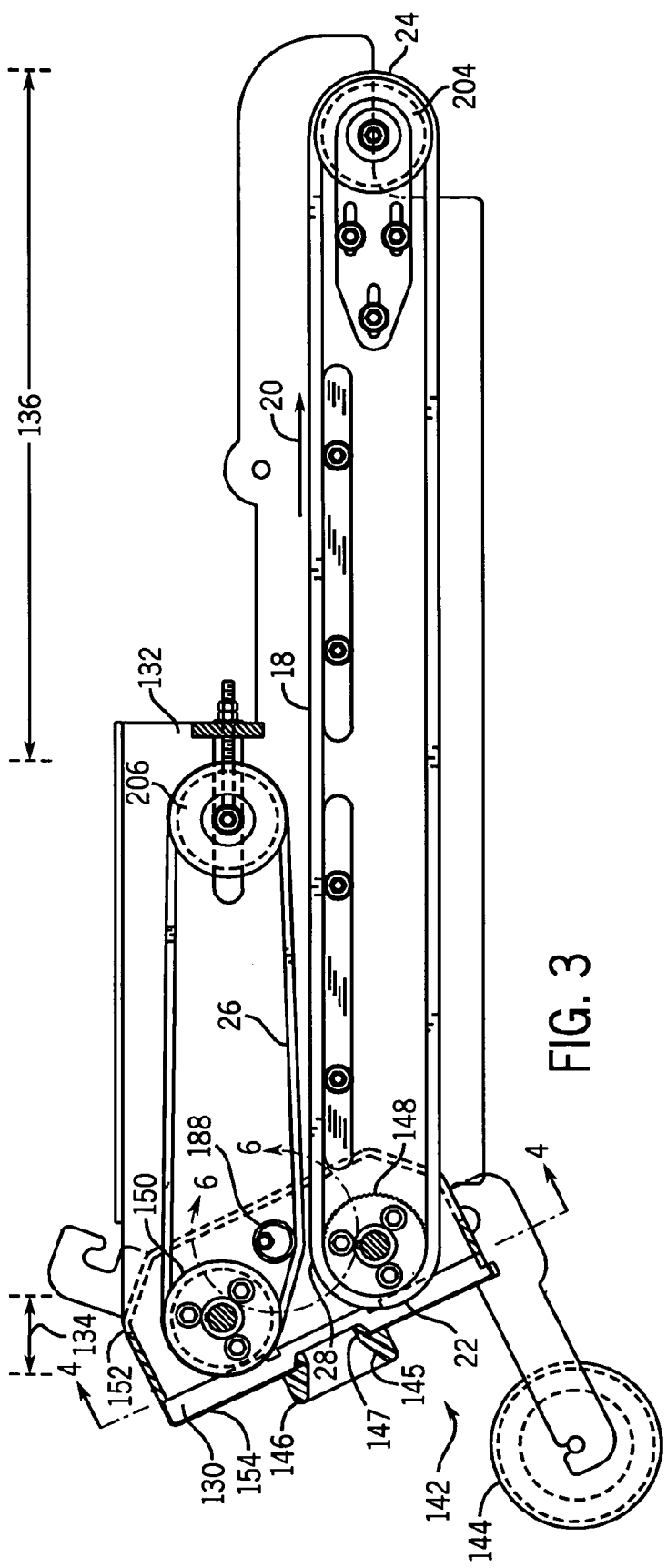
FIG. 3 is a side view partially in section of a portion of the loading system of FIG. 1.

Each of the upper loading conveyors such as 26, FIGS. 1, 3, extends along forward travel direction 20 from an upstream end 130 to a downstream end 132. The length of upper loading conveyor 26 along travel direction 20 is less than the length of lower conveyor 18 along travel direction 20. Upstream end 130 of upper loading conveyor 26 is spaced upstream (rearwardly, i.e., leftwardly in FIGS. 1, 3) of upstream end 22 of lower loading conveyor 18 by an offset distance 134. Downstream end 132 of upper loading conveyor 26 is spaced upstream (rearwardly, i.e., leftwardly in FIGS. 1, 3) of downstream end 24 of lower loading conveyor 18 by an offset distance 136 which is greater than offset distance 134.

The food product strands such as 12 are produced by strand producing machines as known in the prior art, and for which further reference may be had to the above noted incorporated U.S. Pat. Nos. 6,056,636 and 6,086,469. The strands may be directly loaded from such strand producing machine onto a transport conveyor, or may be discharged from the strand producing machine into a bin for temporary storage, and when the bin is full it is moved to a loading station such as 138 in FIG. 1 having such bin 140 holding strand 12 therein, which strand is then manually fed by an operator to the present loading system. An entrance guide 142, FIGS. 1, 3, is spaced upstream of gap 28 and guides strand 12 into such gap. The entrance guide includes an idle roller 144 spaced rearwardly and downwardly of upstream end 22 of lower loading conveyor 18. Strand 12 extends upwardly from bin 140 to idle roller 144 and then upwardly and forwardly to upstream end 22 of lower loading conveyor 18. The entrance guide further preferably includes an inlet cone 146 spaced rearward of upstream end 22 of lower loading conveyor 18. Idle roller 144 is spaced rearwardly and downwardly of inlet cone 46. Strand 12 extends upwardly to idle roller 144 and then upwardly and forwardly to inlet cone 146 and then forwardly to upstream end 22 of lower loading conveyor 18 and into gap 28. Loading conveyors 18 and 26 include respective upstream rotary conveyor pulleys 148 and 150, FIG. 4, housed within an enclosure box 152 having a faceplate 154 protectively covering and blocking access to rotary conveyor pulleys 148, 150 from operator loading station 138. The noted entrance guide is accessible to the operator at the operator loading station and is provided by inlet 146 extending through faceplate 154. Inlet 146 is preferably provided by an annular plastic bushing extending through faceplate 154 and having a frustoconical inner surface providing an inlet cone having a wider entrance mouth 145 tapering to a narrower exit mouth 147. Rotary conveyor pulley 150 is rearward of rotary conveyor pulley 148. Inlet cone 146 is rearward of rotary conveyor pulley 148 and below rotary conveyor pulley 150. The remaining conveyor pairs for each of the noted parallel channels have their own respective dedicated bin such as 140 and respective entrance guides.

Upstream rotary drive pulleys 148, 150 are each driven by a direct drive connection from a motor drive. The same motor 30 drives both of the noted drive pulleys 148 and 150. Motor 30 is preferably a servo motor and provides the noted indexed drive. The motor drives pulleys 148, 150 at the same rotational speed and in opposite rotational directions. Drive pulley 148 includes a driven gear 156, FIGS. 4, 5, on a shaft 158 rotational about an axis 160, which axis extends left-right in FIG. 4, and into and out of the page in FIG. 5. Drive pulley 150 includes a driven gear 162 on a shaft 164 rotational about an axis 166, which axis extends left-right in FIG. 4, and into and out of the page in FIG. 5. Motor 30 has an output drive shaft 168 rotating about an axis 170 and having a drive gear 172 on drive shaft 168 engaging at least one and preferably both of driven gears 156 and 162. Drive gear 172 is preferably a worm gear extending between and engaging each of driven gears 156 and 162 on distally opposite sides of the worm gear. Axes 160 and 166 extend parallel to each other and transversely to forward travel direction 20. Axis 170 in FIG. 5 extends transversely to axes 160 and 166. Axis 170 extends obliquely relative to travel direction 20. Axes 160 and 166 are spaced along a projection line 174 extending transversely therebetween. Axis 170 transversely intersects projection line 174 at a point 176 between driven gears 156 and 162. Projection line 174 extends obliquely relative to forward travel direction 20. Projection line 174 extends obliquely upwardly and rearwardly (upwardly and leftwardly in FIG. 5). Axis 170 extends obliquely upwardly and forwardly (upwardly and rightwardly in FIG. 5). A plurality of motors 30, 112, etc. are provided, one dedicated for each pair of upper and lower loading conveyors, e.g. drive motor 30 for conveyor pair 18, 26, drive motor 112 for conveyor pair 36, 38, and so on. Each respective pair of drive pulleys such as pair 148 and 150, pair 178 and 180, etc., are driven by a direct drive connection from a respective dedicated motor 30, 112, etc. Each respective lower and upper conveyor pair is driven by its respective dedicated motor independently of the remaining conveyor pairs.

Lower and upper loading conveyors 18 and 20 include respective lower and upper conveyor belt 184 and 186, FIGS. 4, 6. A roller cam 188, FIGS. 3, 6, engages one of the belts, preferably upper belt 186, at a location between its respective upstream and downstream ends 130 and 132. The roller cam is adjustably movable toward and away from the other of the belts, for example as shown at the solid line position in FIG. 6 and at the dotted line position 190, to control the noted dimension of gap 28 to be less than or equal to the noted diameter 14 of strand 12. Upper conveyor belt 186 has a bottom side 192 facing downwardly and engaging food product strand 12, and has a top side 194 facing upwardly. Roller cam 188 engages top side 194 of conveyor belt 186 above gap 28. Roller cam 188 is forward (rightwardly in FIG. 3) of drive pulley 150. Roller cam 188 is vertically aligned with drive pulley 148 to locate gap 28 at pulley 148 and forward of pulley 150. The roller cam is provided by an outer race 196 journal around an inner race 198 which is eccentrically mounted on a bolt 200. The remaining roller cams such as 202 are comparable.

Lower loading conveyor 18 is provided by the noted conveyor belt 184 trained around upstream and downstream pulleys 148 and 204, FIG. 3. Upper loading conveyor 26 is provided by the noted conveyor belt 186 trained around upstream and downstream pulleys 150 and 206. Belts 184 and 186 have respective inner surfaces 208 and 194, FIG. 6, engaging its respective pulleys, and have respective outer surfaces 210 and 192 facing oppositely to the respective inner surface and engaging the food product strand 12. Both belts 184 and 186 are preferably of self-lubricating hygienic material, preferably plastic, and further preferably thermoplastic. The inner surface such as 208 of at least one of the belts such as 184 and at least one of its respective pulleys such as 148 are cogged, and further preferably both inner surfaces 208 and 194 of the belts and both of the respective upstream and downstream pulleys are cogged. The outer surface 210 of lower belt 184 has raised lips 212 and 214, FIG. 7, extending along forward travel direction 20 and laterally spaced by a surface 216 having a concave curvature complemental to food product strand 12 for guiding and cradling the strand through gap 28 and traversal along forward travel direction 20. Further preferably, outer surface 194 of upper belt 186 has raised lips 218 and 220 extending along forward travel direction 20 and laterally spaced by a surface 222 having a concave curvature complemental to food product strand 12 for guiding and cradling the strand through gap 28 and traversal along forward travel direction 20.

The noted thermoplastic belts eliminate the need for petroleum based lubrication, which is desirable. It may be further desirable to provide a lubricated path for food product strand 12 along transfer ramp 68 by a water spray or the like, and additional water spray lubrication for worm gear 172 and driven gears 156 and 162. The system desirably provides modular space-and-cost-saving units, to load a plurality of products onto a transport conveyor. The modular units allow replacement of individual units without shutting down the entire continuous system which the units are loading. The present loading system desirably avoids problems encountered with prior daisy-chain loading apparatus wherein a common singular drive or motor drives all lanes, and the failure of one lane of the loader results in a shutdown of the entire system until maintenance can either temporarily disable the defective lane and re-start the processing system, or repair the apparatus entirely. Various types of sensors 120 may be used, including fiber optic sensors and limit switch sensors. The noted thermoplastic belts are further desirable because of their easy cleanability and because they do not promote product build-up during operation, in contrast to prior metal roller chains and the like, thus providing further advantages in addition to the noted sanitary hygienic advantage. The housings and drive systems, e.g. FIGS. 4, 5, are preferably stainless steel, to further enhance sanitary and hygienic performance and to resist corrosion against washdown with strong cleaners. It is further preferred to use thermoplastic gears such as 172, 162, 156, and a thermoplastic idle roller 188, which do not require lubrication by oil or petroleum products.

It is recognized that various equivalents, alternatives and modifications are possible within the scope of the appended claims.

What is claimed is:

1. A loading system for loading an elongated strand of food product of a given diameter on a transport conveyor, comprising a first loading conveyor extending along a forward travel direction from an upstream entrance end to a downstream exit end, a second loading conveyor spaced above said first loading conveyor by a gap having a dimension less than or equal to said given diameter such that said strand is frictionally engaged by both of said first and second loading conveyors to pull said strand into said gap and such that said strand is conveyed from said upstream entrance end to said downstream exit end by an indexed drive and discharged at said downstream exit end to said transport conveyor, wherein said first and second loading conveyors comprise respective first and second upstream rotary drive pulleys each driven by a motor, wherein the same said motor drives both of said first and second drive pulleys, wherein said motor drives said first and second pulleys at the same rotational speed and in opposite rotational directions, wherein said first drive pulley comprises a first driven gear on a first shaft rotational about a first axis, said second drive pulley comprises a second driven gear on a second shaft rotational about a second axis, and wherein said motor has an output drive shaft rotating about a third axis and having a drive gear on said drive shaft engaging at least one of said first and second driven gears, and wherein said drive gear comprises a worm gear extending between and engaging each of said first and second driven gears on distally opposite sides of said worm gear.

2. A loading system for loading an elongated strand of food product of a given diameter on a transport conveyor, comprising a first loading conveyor extending along a forward travel direction from an upstream entrance end to a downstream exit end, a second loading conveyor spaced above said first loading conveyor by a gap having a dimension less than or equal to said given diameter such that said strand is frictionally engaged by both of said first and second loading conveyors to pull said strand into said gap and such that said strand is conveyed from said upstream entrance end to said downstream exit end by an indexed drive and discharged at said downstream exit end to said transport conveyor, wherein said first and second loading conveyors comprise respective first and second upstream rotary drive pulleys each driven by a motor, wherein the same said motor drives both of said first and second drive pulleys, wherein said motor drives said first and second pulleys at the same rotational speed and in opposite rotational directions, wherein said first drive pulley comprises a first driven gear on a first shaft rotational about a first axis, said second drive pulley comprises a second driven gear on a second shaft rotational about a second axis, and wherein said motor has an output drive shaft rotating about a third axis and having a drive gear on said drive shaft engaging at least one of said first and second driven gears, wherein said first and second axes extend parallel to each other and transversely to said forward travel direction, and said third axis extends transversely to said first and second axes, and wherein said third axis extends obliquely relative to said forward travel direction.

3. A loading system for loading an elongated strand of food product of a given diameter on a transport conveyor, comprising a first loading conveyor extending along a forward travel direction from an upstream entrance end to a downstream exit end, a second loading conveyor spaced above said first loading conveyor by a gap having a dimension less than or equal to said given diameter such that said strand is frictionally engaged by both of said first and second loading conveyors to pull said strand into said gap and such that said strand is conveyed from said upstream entrance end to said downstream exit end by an indexed drive and discharged at said downstream exit end to said transport conveyor, wherein said first and second loading conveyors comprise respective first and second upstream rotary drive pulleys each driven by a motor, wherein the same said motor drives both of said first and second drive pulleys, wherein said motor drives said first and second pulleys at the same rotational speed and in opposite rotational directions, wherein said first drive pulley comprises a first driven gear on a first shaft rotational about a first axis, said second drive pulley comprises a second driven gear on a second shaft rotational about a second axis, and wherein said motor has an output drive shaft rotating about a third axis and having a drive gear on said drive shaft engaging at least one of said first and second driven gears, and wherein said first and second axes are spaced along a projection line extending transversely therebetween, and wherein said third axis intersects said projection line.

4. The loading system according to claim 3 wherein said third axis transversely intersects said projection line.

5. The loading system according to claim 4 wherein said third axis transversely intersects said projection line at a point between said first and second driven gears.

6. A loading system for loading an elongated strand of food product of a given diameter on a transport conveyor, comprising a first loading conveyor extending along a forward travel direction from an upstream entrance end to a downstream exit end, a second loading conveyor spaced above said first loading conveyor by a gap having a dimension less than or equal to said given diameter such that said strand is frictionally engaged by both of said first and second loading conveyors to pull said strand into said gap and such that said strand is conveyed from said upstream entrance end to said downstream exit end by an indexed drive and discharged at said downstream exit end to said transport conveyor, wherein said first and second loading conveyors comprise respective first and second upstream rotary drive pulleys each driven by a motor, wherein the same said motor drives both of said first and second drive pulleys, wherein said motor drives said first and second pulleys at the same rotational speed and in opposite rotational directions, wherein said first drive pulley comprises a first driven gear on a first shaft rotational about a first axis, said second drive pulley comprises a second driven gear on a second shaft rotational about a second axis, and wherein said motor has an output drive shaft rotating about a third axis and having a drive gear on said drive shaft engaging at least one of said first and second driven gears, wherein said first and second axes extend parallel to each other and transversely to said forward travel direction and are spaced along a projection line extending transversely therebetween and obliquely relative to said forward travel direction, wherein said third axis extends obliquely relative to said forward travel direction, and wherein said projection line extends obliquely upwardly and rearwardly, and said third axis extends obliquely upwardly and forwardly.

7. The loading system according to claim 6 wherein said projection line and said third axis intersect each other.

8. The loading system according to claim 6 wherein said projection line and said third axis are transverse to each other.

9. A loading system for loading an elongated strand of food product of a given diameter on a transport conveyor, comprising a first loading conveyor extending along a forward travel direction from an upstream entrance end to a downstream exit end, a second loading conveyor spaced above said first loading conveyor by a gap having a dimension less than or equal to said given diameter such that said strand is frictionally engaged by both of said first and second loading conveyors to pull said strand into said gap and such that said strand is conveyed from said upstream entrance end to said downstream exit end by an indexed drive and discharged at said downstream exit end to said transport conveyor, wherein said second loading conveyor extends along said forward travel direction from an upstream end to a downstream end, wherein said first and second loading conveyors comprise respective first and second conveyor belts, and comprising a roller cam engaging one of said belts at a location between said upstream and downstream ends, said roller cam being adjustably movable toward and away from the other of said belts to control said dimension of said gap, wherein said second conveyor belt has a bottom side facing downwardly and engaging said strand of said food product, and has a top side facing upwardly, and wherein said roller cam engages said top side of said second conveyor belt above said gap, wherein said first and second loading conveyors comprise respective first and second upstream rotary pulleys, said second pulley being spaced rearwardly and upwardly from said first pulley, and wherein said roller cam is forward of said second pulley, and wherein said roller cam is vertically aligned with said first pulley to locate said gap at said first pulley and forward of said second pulley.

10. A method for loading an elongated strand of food product of a given diameter on a transport conveyor, comprising providing a first loading conveyor extending along a forward travel direction from an upstream entrance end to a downstream exit end, providing a second loading conveyor spaced above said first loading conveyor by a gap having a dimension less than or equal to said given diameter, frictionally engaging said strand with both of said first and second loading conveyors and pulling said strand into said gap and conveying said strand from said upstream entrance end to said downstream exit end by an indexed drive, and discharging said strand at said downstream exit end to said transport conveyor, and comprising providing an entrance guide spaced upstream of said gap, and guiding said strand into said gap through said entrance guide, and comprising providing said entrance guide as an idle roller spaced rearwardly and downwardly of said upstream end of said first loading conveyor, and feeding said strand upwardly to said idle roller and then upwardly and forwardly to said upstream end of said first loading conveyor.

11. A method for loading an elongated strand of food product of a given diameter on a transport conveyor, comprising providing a first loading conveyor extending along a forward travel direction from an upstream entrance end to a downstream exit end, providing a second loading conveyor spaced above said first loading conveyor by a gap having a dimension less than or equal to said given diameter, frictionally engaging said strand with both of said first and second loading conveyors and pulling said strand into said gap and conveying said strand from said upstream entrance end to said downstream exit end by an indexed drive, and discharging said strand at said downstream exit end to said transport conveyor, and comprising providing an entrance guide spaced upstream of said gap, and guiding said strand into said gap through said entrance guide, and comprising providing said entrance guide accessible to an operator at an operator loading station, providing said first and second loading conveyors with first and second rotary conveyor pulleys, providing a faceplate blocking access to said rotary conveyor pulleys from said operator loading station, providing said entrance guide as an inlet through said faceplate, and feeding said strand through said inlet through said faceplate and into said gap.

12. A method for loading an elongated strand of food product of a given diameter on a transport conveyor, comprising providing a first loading conveyor extending along a forward travel direction from an upstream entrance end to a downstream exit end, providing a second loading conveyor spaced above said first loading conveyor by a gap having a dimension less than or equal to said given diameter, frictionally engaging said strand with both of said first and second loading conveyors and pulling said strand into said gap and conveying said strand from said upstream entrance end to said downstream exit end by an indexed drive, and discharging said strand at said downstream exit end to said transport conveyor, and comprising providing an entrance guide spaced upstream of said gap, and guiding said strand into said gap through said entrance guide, and comprising providing said entrance guide with a combination of an inlet cone spaced rearwardly of said upstream end of said loading conveyor and an idle roller spaced rearwardly and downwardly of said inlet cone, and feeding said strand upwardly to said idle roller and then upwardly and forwardly to said inlet cone and then forwardly to said upstream end of said loading conveyor.

* * * * *